Dec. 19, 1950     E. J. DILLMAN     2,534,251
AUTOMATIC VALVE
Filed Oct. 23, 1946
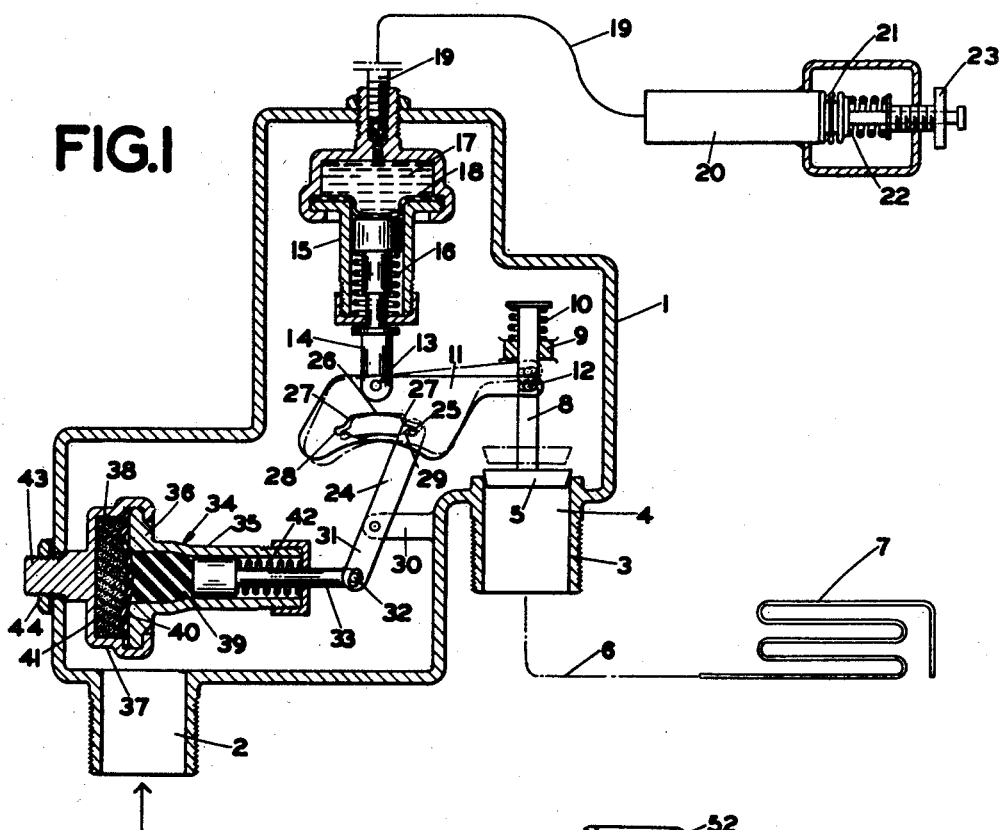
INVENTOR.
Earnest J. Dillman
BY
Andrew K. Foulds
his ATTORNEY Patented Dec. 19, 1950

2,534,251

UNITED STATES PATENT OFFICE 2,534,251

AUTOMATIC VALVE

Earnest J. Dillman, Detroit, Mich., assignor to Detroit Lubricator Company, Detroit, Mich., a corporation of Michigan Application October 23, 1946, Serial No. 705,042

9 Claims. (Cl. 236—1)

This invention relates to new and useful improvements in automatically actuated valves and more particularly to a valve which is controlled by both the temperature of the controlled fluid and the temperature of a medium affected by heat exchange with the controlled fluid.

An object of the invention is to provide a valve having a single valve member which is automatically actuated by a single temperature responsive means so as to close the valve member at a predetermined low temperature when cooling fluid is supplied to the valve and to close the valve at a predetermined high temperature when heating fluid is supplied to the valve.

Another object is to provide novel changeover means actuated by the temperature of the fluid supplied to the valve to reverse the direction of valve member movement by a one direction movement of means responsive to temperature external of the valve.

The invention consists in the improved construction and cooperative arrangement of parts to be more fully described hereinafter and the novelty of which will be particularly pointed out and distinctly claimed.

In the accompanying drawings, to be taken as a part of this specification, there are fully and clearly illustrated several preferred embodiments of the invention, in which drawings:

Figure 1 is a view in section, partly diagrammatic, of a valve embodying the invention and controlling flow to a heat exchanger, and Fig. 2 is a view in section of another valve structure embodying the invention.

Referring to the drawings by characters of reference, in Fig. 1, the numeral 1 designates a valve casing having an inlet 2 for connection to a pipe or conduit for conveying a heat exchange medium such as water. The casing has an outlet 3 with an outlet port 4 controlled by a valve member 5. The outlet 3 is connected by a pipe or conduit 6 to a heat exchanger 7 for modifying the temperature of the air or other medium in an enclosure or a space to be air conditioned. The valve member 5 is carried by a stem or rod 8 longitudinally reciprocal in a guide member 9 and urged toward open position by a spring 10. An operating lever 11 has a pin and slot engagement with the stem 8, as at 12, and extends transverse to the stem 8. Pivotally connected to the lever 11, as at 13, there is a thrust or operating member 14 which is reciprocally supported in a power element casing 15 rigidly mounted on a wall of the valve casing. The spring 10 is opposed by a spring 16 surrounding and acting through the thrust member 14. The spring 16 exerts sufficient force to overcome the spring 10 and seat the valve member 5 in port closing position. The casing 15 has an expansion chamber 17 closed by a diaphragm 18, preferably of "Ameripol" or the like and acting against the thrust member 14 in opposition to the spring 16. The chamber 17 is connected by a tube 19 to a feeler element or capsule 20 of variable capacity by means of a bellows member 21 which is compressible by a lost-motion spring 22 having an adjustment screw 23. The chamber 17, tube 19 and capsule 20 are filled with a temperature responsive liquid, such as alcohol. The pivot 13 is the normal driving connection between the thrust member 14 and the lever 11, but under other conditions serves as the fulcrum for the lever 11. In normal valve member operation, the lever 11 is fulcrumed on a lever or arm 24 having a pivot pin 25 which extends into an arcuate longitudinally extending slot 26 in the lever 11. The slot 26 has upper and lower inclined cam portions 27 at each end which lead into bearing groove portions 28, 29 respectively at opposite ends of the slot 26. When the pivot pin 25 is in the groove portion 29, as shown, temperature increase at the bulb element 20 will rotate the lever 11 counterclockwise to open the valve member 5. The arm 24 is pivoted on a bracket 30 projecting from the casing wall. The lower or free end 31 of the arm 24 is pivotally secured by a pin and slot engagement, as at 32, to one end of a thrust rod 33 of a thermostatic actuator or power element 34. The rod 33 is guided for longitudinal reciprocation in a tubular casing 35 having an end flange 36 forming the cap or cover of a cup or container 37 having an expansion chamber 38. Within the casing 35 there is a sealing plug 39 which abuts at one end the piston portion of the plunger 33 and at its other end seats on a flexible diaphragm 40 clamped and sealed at its periphery between the flange 36 and a shoulder in the side wall of the cup 37. The chamber 38 is filled with an expansible-contractible temperature responsive material 41 which may be a mixture of one or more waxes, a binder and finely divided metal. Expansion of the material 41 is opposed by a spring 42 which also serves to return the plunger 33 upon decreasing temperature. The power element 34 is described in the Vernet Patent 2,368.181 January 30, 1945. The cup 37 has a supporting post 43 which projects through an aperture in the side wall of the casing 1 so as to position the responsive material 41 in the path of the heat exchange medium entering the inlet 2. The post 43 is locked and sealed to the casing by a nut and gasket 44.

The operation of the system of Fig. 1 is as follows: The inlet 2 is being supplied with a cooling fluid, such as cold water, which has caused the power element 34 to retract the plunger 33 and position the fulcrum 25 in the groove portion 29. Now, if the temperature at the bulb element 20 increases to say 72° F., the volatile liquid will push the diaphragm 18 downward thereby rotating the lever 11 counterclockwise against the force of spring 16 and opening the valve member 5 which is aided by the spring 10. The wide open position of the valve member 5 and the corresponding position of the lever 11 is shown in dot-dash lines. Cooling fluid will now flow through the outlet 3 and pipe 6 to and through the exchanger 7, thereby cooling the air or other surrounding medium to which the bulb element 20 is exposed. When the temperature of the fluid in the bulb element 20 falls below 72° F., the spring 16 will overcome the spring 10 and close the valve member 5. If it is desired to heat the air or other medium surrounding the exchanger 7, a heating medium, such as hot water will be supplied to the inlet 2. This will act on the power element 34 to move the plunger 33 outward, thereby rotating the arm 24 until the fulcrum pin 25 seats in the groove portion 28. This operation of the arm 24 will not change the position of the valve member 5, except in the intermediate area or length of the slot 26 where it is of increased width. As the pin 25 leaves the portion 29, the spring 10 will open the valve member 5 so that the heating fluid will flow over the element 34, thereby assuring its complete response and full movement of the pin 25 into the groove portion 28. The cam surface 27 guides the pin 25 into the portion 28 thereby closing the valve member 5. If the temperature affecting the bulb element 20 now falls below 72° F., the spring 16 will pull upward on the lever 11 and lift the valve member 5 to open position for flow of the heating medium to the coil or exchanger 7. Heating of the element 20 will move the rod 14 downward and the valve member 5 toward closed position. The change-over element 34 is also operable to actuate the valve member 5 from an open to a closed position. With the arm 24 in the position shown, and with the lever 11 in the dot-dash line or open valve position, an increase in temperature of the medium supplied to the inlet 2, such as when heating by the exchanger 7 is desired, will rock the arm 24 toward the slot end 28 and cause the pin 25 to cam the lever 11 in a clockwise direction about the pin 13, thereby closing the valve member 5.

In Fig. 2, the casing 50 has an inlet 51 and an outlet 52 for connection by a pipe or conduit to a heat exchanger, such as the exchanger 7 of Fig. 1. The outlet 52 has a port 53 controlled by a valve member 54 having an operating rod or stem 55 guided for longitudinal reciprocation in a sleeve member 56 secured to the casing 50. Connected to the stem 55 by a pin and slot pivot as at 57, is one end of a lever 58 which is pivoted on a pin or shaft 59 projecting from the casing wall. The lever 58 has a longitudinal arcuate slot 60 extending equi-distant on each side of the shaft 59. Slidably fitting in the slot 60 is a lever-operating pin 61 carried by a supporting arm 62 which forms the thrust member or plunger of a temperature responsive power element 63, generally similar to the power element having the casing 15. The plunger 62 is reciprocally guided in a tubular casing 64 having an expansion chamber 65 closed by a flexible diaphragm 66 of rubber-like material, such as "Ameripol," on which the plunger 62 seats. Outward or upward movement of the plunger 62 to rotate the lever 58 by expansion of the chamber 65 is opposed by a coil spring 67 surrounding the plunger 62. The chamber 65 is connected by a tube 68 to a feeler element or bulb 69 positioned in the medium, such as air, which is to have its temperature controlled. The chamber 65, tube 68 and bulb 69 are filled with a temperature responsive liquid, such as alcohol. The power element casing 64 is pivotally supported on oppositely positioned pins or trunnions 70 supported by the casing 50 such that the casing 64 is rockable longitudinally of the lever 58. The opening through the wall of the casing 50 in which the casing 64 is journaled and through which the casing 64 projects, is closed by a flexible diaphragm 71 which is sealed to the casings 50 and 64. The casing 64 is movable in a clockwise direction by a thermostatic power element 72, similar to the element 34 of Fig. 1. The power element plunger or push rod 73 is pivotally connected to the casing 64, as at 74, and is reciprocally guided in a cylindrical casing portion 75. The element 72 has an expansion chamber 76 containing an expansible-contractable temperature responsive material 77, such as the material 41 of Fig. 1, which acts against a sealing diaphragm 78 to move a sealing plug 79 in abutting engagement with the rod 73. The casing of the element 72 is rigidly supported in alinement with and adjacent the inlet 51 by a stud or post 80 projecting from its bottom wall and extending through an opening in the wall of the casing 50 in which it is secured and sealed by a nut and gasket, as at 81. Expansion of the material 77 is opposed by a spring 82 positioned and held under compression between the wall of casing 50 and the power element casing 64. The spring 82 also serves to rock the casing 64 counterclockwise upon temperature decrease affecting the power element 72. A bleed hole 83 is provided in the valve member to assure response of the element 72 to change from heating to cooling medium and vice versa.

The operation of the device and system of Fig. 2 is as follows: As shown, warm or hot water is being supplied through the inlet 51 and has expanded the power element 72 to position the operating pin 61 at the right hand end of the slot 60. If now, the temperature surrounding the bulb 69 decreases to say 72° F., the spring 67 will move the plunger 62 inward or downward, thereby rotating the lever 58 clockwise and opening the valve member 54. Closing movement of the valve member 54 by temperature increase and upward movement of the diaphragm 66 will be apparent. If, while the valve member 54 is open, the temperature of the water or medium supplied to the inlet 51 is decreased such as to cause contraction of the material 77, then the power element 63 will be rocked to the left under the force of the spring 82. As the pin 61 moves along the slot 60 in its dash-dot line position, the pin 61 will rotate the lever 58 counterclockwise and close the valve member 54. In this new position of the pin 61 at the left hand end of the slot 60, an increase of temperature at the bulb 69 will expand the chamber 65 and move the rod 62 upward thereby rotating the lever 58 clockwise and opening the valve member 54. The power element 72 thus serves as a change-over means to automatically determine the operation of the valve member 54 by the ambient temperature responsive element 63.

Having thus described my invention, what is claimed and is desired to be secured by Letters Patent of the United States is:

1. A temperature responsive valve for regulating the flow of heating and of cooling medium, comprising a valve casing having an inlet and an outlet port, a valve member cooperable with said port, a lever operable to move said valve member, a thrust member operable to rotate said lever, means responsive to temperature external of said casing to actuate said thrust member, means to change the relation between the thrust member and the fulcrum of said lever to reverse the direction of valve member movement for a given direction of thrust member movement, and means responsive to change in the temperature of the fluid in said casing to actuate said last-named means.

2. A temperature responsive valve for regulating the flow of heating and of cooling medium, comprising a valve casing having an inlet and an outlet port, a valve member cooperable with said port, a lever operable to move said valve member and having a fulcrum, said lever having a cam slot extending longitudinally of said lever and to opposite sides of said fulcrum, a pivoted arm having a follower member riding in said slot, means responsive to change in the temperature of the fluid in said casing and operatively connected to said arm to move said follower member from one side to the other of said fulcrum thereby to move said valve member.

3. A temperature responsive valve for regulating the flow of heating and of cooling medium, comprising a valve casing having an inlet and an outlet port, a valve member cooperable with said port, a lever operable to move said valve member, a power element responsive to temperature external of said casing and having a thrust member pivoted to said lever, an arm pivotally supported in said casing and movable into pivotal supporting engagement with said lever on opposite sides of the pivotal engagement of said thrust member and said lever, and means responsive to change of temperature of the fluid in said casing and operable to move said arm from one side to the other of said pivotal engagement thereby to reverse the movement of said valve member by one direction movement of said power element.

4. A temperature responsive valve for regulating the flow of heating and of cooling medium, comprising a valve casing having an inlet and an outlet port, a valve member cooperable with said port, a lever operable to move said valve member, a power element responsive to temperature external of said casing and having a thrust member pivoted to said lever, an arm pivotally supported in said casing and movable into pivotal supporting engagement with said lever on opposite sides of the pivotal engagement of said thrust member and said lever, means responsive to change of temperature of the fluid in said casing and operable to move said arm from one side to the other of said pivotal engagement thereby to reverse the movement of said valve member by one direction movement of said power element, and means to open and then to close said valve member during the movement of said arm.

5. A temperature responsive valve for regulating the flow of heating and of cooling fluid, comprising a valve casing having an inlet and an outlet port, a valve member cooperable with said port, a lever operable to move said valve member and having a longitudinally extending cam slot terminating on opposite sides of the lever fulcrum, a power element having a casing and responsive to temperature changes external of said valve casing, means pivotally supporting said element casing, a thrust member carried by said element casing and having a follower member riding in said slot, means responsive to change of temperature of the fluid in said valve casing, and means operatively connecting said responsive means to said element casing to rock said element casing thereby to position said follower member on one side or the other of the lever fulcrum.

6. A temperature responsive valve for regulating the flow of heating and of cooling medium, comprising a valve casing having an inlet and an outlet port, a valve member cooperable with said port, a lever operable to move said valve member, a thrust member operable to rotate said lever, means responsive to temperature external of said casing to actuate said thrust member, and means to change the relation between the thrust member and the fulcrum of said lever to reverse the direction of valve member movement for a given direction of thrust member movement, and means including a cam slot and pin connection associated with and operable to open and then to close said valve member during operation of said last-named means.

7. A temperature responsive valve for regulating the flow of heating and of cooling medium, comprising a valve casing having an inlet and an outlet port, a valve member cooperable with said port, a lever operable to move said valve member and having a fulcrum, said lever having a cam slot extending longitudinally of said lever and to opposite sides of said fulcrum, a pivoted arm having a follower member riding in said slot, means operatively connected to said arm to move said follower member from one side to the other of said fulcrum thereby to move said valve member.

8. A temperature responsive valve for regulating the flow of heating and of cooling medium, comprising a valve casing having an inlet and an outlet port, a valve member cooperable with said port, a lever operable to move said valve member, a power element responsive to temperature external of said casing and having a thrust member pivoted to said lever, an arm pivotally supported in said casing providing a fulcrum for said lever and movable into pivotal supporting engagement with said lever on opposite sides of the pivotal engagement of said thrust member and said lever, and means operable to move said arm from one side to the other of said pivotal engagement thereby to reverse the movement of said valve member by one direction movement of said power element.

9. A temperature responsive valve for regulating the flow of heating and of cooling medium, comprising a valve casing having an inlet and an outlet port, a valve member cooperable with said port, a lever operable to move said valve member, a power element responsive to temperature external of said casing and having a thrust member pivoted to said lever, an arm pivotally supported in said casing providing a fulcrum for said lever and movable into pivotal supporting engagement with said lever on opposite sides of the pivotal engagement of said thrust member and said lever, means operable to move said arm from one side to the other of said pivotal engagement thereby to reverse the movement of said valve member by one direction movement of said power element, and means to open and then to close said valve member during the movement of said arm.

EARNEST J. DILLMAN.

REFERENCES CITED

The following references are of record in the file of this patent:

UNITED STATES PATENTS

| Number | Name | Date |
|---|---|---|
| 2,141,464 | Gorrie | Dec. 27, 1938 |
| 2,285,513 | Harris | June 9, 1942 |
| 2,310,293 | Joesting | Feb. 9, 1943 |